(12) United States Patent
Kim et al.

(10) Patent No.: US 9,819,229 B2
(45) Date of Patent: Nov. 14, 2017

(54) APPARATUS FOR RECEIVING NON-CONTACT ENERGY AND CONTROLLING METHOD THEREFOR

(71) Applicant: INDUSTRY-UNIVERSITY COOPERATION FOUNDATION HANYANG UNIVERSITY, Seoul (KR)

(72) Inventors: Tae-Whan Kim, Seoul (KR); Joo-Hyung You, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 241 days.

(21) Appl. No.: 14/369,184

(22) PCT Filed: Mar. 29, 2013

(86) PCT No.: PCT/KR2013/002661
§ 371 (c)(1),
(2) Date: Jun. 26, 2014

(87) PCT Pub. No.: WO2013/165097
PCT Pub. Date: Nov. 7, 2013

(65) Prior Publication Data
US 2015/0054342 A1  Feb. 26, 2015

(30) Foreign Application Priority Data

Apr. 30, 2012 (KR) .................. 10-2012-0045766
Mar. 29, 2013 (KR) .................. 10-2013-0034584

(51) Int. Cl.
*H02J 7/00* (2006.01)
*H02J 9/00* (2006.01)
*H02J 17/00* (2006.01)

(52) U.S. Cl.
CPC ........... *H02J 17/00* (2013.01); *Y10T 307/625* (2015.04)

(58) Field of Classification Search
CPC .. H02J 9/061; H02J 7/0068; H02J 9/06; H02J 9/062; H02J 7/35; H02J 7/007;
(Continued)

(56) References Cited

U.S. PATENT DOCUMENTS 7,254,159 B1 * 8/2007 Lavelle ................ H04B 1/7156
                                                  370/342
9,041,359 B2 * 5/2015 Ro ........................ H02J 7/0065
                                                  320/108
(Continued)

FOREIGN PATENT DOCUMENTS

JP      2010-166675 A      7/2010
KR  10-2007-0113486 A     11/2007
(Continued)

OTHER PUBLICATIONS

International Search Report for PCT/KR2013/002661 filed Mar. 29, 2013.

*Primary Examiner* — Jared Fureman
*Assistant Examiner* — Esayas Yeshaw (57) ABSTRACT

The present invention provides an apparatus for receiving non-contact energy that includes; a receiving unit that is spaced from a transmitting unit and receives thermal or light energy from the transmitting unit; an energy converting unit that converts the thermal or light energy received from the receiving unit into electric energy and supplies electric energy to a target device; and an auxiliary power that receives electric energy from the receiving unit or the energy converting unit and supplies electric energy to the target device when the energy transmitted from the receiving unit or the energy converting unit to the target device is cut off, and a method of controlling the device. According to the
(Continued)

present invention, it is possible to stably supply energy that is not harmful to the human body and, has a wide transmission region.

12 Claims, 6 Drawing Sheets (58) Field of Classification Search
CPC .. H02J 3/383; H02J 3/32; H02J 7/0077; H02J 9/00; H02J 1/10; H02J 7/34; H02J 9/04; H02J 1/00; H02J 2009/063
USPC .......................................................... 307/66
See application file for complete search history.

(56) References Cited

U.S. PATENT DOCUMENTS

| | | | | |
|---|---|---|---|---|
| 2001/0020802 | A1* | 9/2001 | Kitagawa | H02J 7/0068 307/66 |
| 2001/0048364 | A1* | 12/2001 | Kalthoff | G01S 5/0009 340/573.1 |
| 2008/0265087 | A1 | 10/2008 | Quinn et al. | |
| 2009/0021219 | A1* | 1/2009 | Yoda | H02J 7/0011 320/137 |
| 2010/0187832 | A1* | 7/2010 | Holland | G05B 19/042 290/1 A |
| 2010/0231163 | A1* | 9/2010 | Mashinsky | B60L 11/182 320/108 |
| 2010/0320362 | A1* | 12/2010 | Alpert | H01S 3/083 250/200 |
| 2011/0282807 | A1* | 11/2011 | Colello | G06Q 50/06 705/412 |
| 2012/0025631 | A1* | 2/2012 | Shionoiri | H02J 17/00 307/149 |
| 2012/0098432 | A1* | 4/2012 | Recker | H05B 33/0815 315/86 |
| 2014/0077617 | A1* | 3/2014 | Nakano | H04B 5/0037 307/104 |

FOREIGN PATENT DOCUMENTS

| | | |
|---|---|---|
| KR | 10-2011-0130037 A | 12/2011 |
| KR | 10-2012-0009929 A | 2/2012 |

* cited by examiner

APPARATUS FOR RECEIVING NON-CONTACT ENERGY AND CONTROLLING METHOD THEREFOR

TECHNICAL FIELD

The present invention relates to an apparatus for receiving non-contact energy and a controlling method thereof, and more particularly, an apparatus for receiving non-contact energy which can wirelessly supply electric power or energy, using light or thermal energy and a method of controlling the apparatus.

BACKGROUND ART

A wireless energy transfer technology, which is a latest technology capable of supplying power anytime and anywhere even without an electric cable, is expected as a future technology having potential over the present wireless communication technology In the wireless energy transfer technologies of the related art, for example, there are an electromagnetic inductive type using electromagnetic induction, an electromagnetic resonance type using electromagnetic resonance, and a microwave type.

The electromagnetic inductive type, one of the technologies of the related art, generates electromotive force on one coil of two adjacent coils by means of magnetic flux that is generated when current is applied to the other coil, using two electromagnetic inductances. In this type of electromagnetic induction, there is a need of sensing and protecting against metallic foreign substances due to magnetic inductive heat, deterioration of electric characteristics such as interference is caused by influence on the noise characteristic of other electronic devices, and the problem with the lifespan due to heat generation and chemical reaction in charging of a battery has been pointed out, and especially, the concern about harmfulness to the human has a latent problem and causes an argument about safety. Further, the energy transfer range limited to several millimeters to several centimeters has been pointed out as a critical problem of the electromagnetic induction type.

The electromagnetic resonance type, another type of technology, has the operation range increased up to 4 m in comparison to the electromagnetic inductive type, using non-radiative resonance, but the short available distance is still a problem in the actual operation and a low transmission efficiency due to the loss of the heat and the electric wave of the electromagnetic field has been pointed as an obstacle to spread of the energy transfer technology.

Further, it cannot be applied to large-capacity consumer electronics (CE) having capacity of over tens of watts, including a television, due to low transfer efficiency and a distance limit.

Due to those problems of the related art, there is a need of a new type of wireless energy transfer technology that has a wide wireless energy transfer range and can stably supply energy with high energy transfer efficiency without harmfulness to the human body.

DISCLOSURE

Technical Problem

The present invention provides an apparatus for receiving non-contact energy which has a wide energy transfer region and can stably supply electric power without harmfulness to the human body, and a method of controlling the apparatus.

The present invention provides an apparatus for receiving non-contact energy that stably supply electric power and energy to a target device such as consumer electronics regardless of the situation around, using an auxiliary power, and a method of controlling the apparatus.

The present invention provides an apparatus for receiving non-contact energy which supplies energy to a target device, using an auxiliary power that keeps storing energy, when wireless energy supply is interfered by an obstacle between a transmitting unit and a receiving unit or between a transmitting unit and a diverging unit.

Technical Solution

In order to achieve the objects, an apparatus for receiving non-contact energy according to an embodiment of the present invention may include: a receiving unit that is spaced from a transmitting unit and receives thermal or light energy from the transmitting unit; an energy converting unit that converts the thermal or light energy received from the receiving unit into electric energy and supplies electric energy to a target device; and an auxiliary power that receives electric energy from the receiving unit or the energy converting unit and supplies electric energy to the target device when the energy transmitted from the energy converting unit to the target device is cut off.

As described above, as electric power or energy is transmitted in a non-contact or wireless type by thermal energy or light energy, it is possible to achieve the apparatus for receiving non-contact energy that has a wide wireless energy transfer region and can stably supply electric power with high energy transfer efficiency without being harmful to the human body.

The apparatus for receiving non-contact energy may include a control unit that includes: a wireless energy transfer mode control unit that performs control such that electric energy is transmitted from the energy converting unit to the target device; an auxiliary power operation mode control unit that performs control such that electric energy is transmitted from the auxiliary power to the target device; an auxiliary power remainder sensing unit that senses the charging amount of the auxiliary power; and an auxiliary power remainder warning unit that sends a warning signal to a user when the charging amount of the auxiliary power is less than a reference value, in which the auxiliary power remainder sensing unit or the auxiliary power remainder warning unit may be connected with the auxiliary power and control energy transfer between the auxiliary power and the energy converting unit or the target device.

The transmitting unit may transmit energy at least in any one type of a laser, natural light or artificial light.

The receiving unit may include at least any one of a solar cell, a solar collector, or a solar concentrator.

The energy converting unit or the auxiliary power may be disposed in the target device or formed integrally with the target device.

Further, in order to achieve the objects of the present invention, an apparatus for receiving non-contact energy may include: a diverging unit that spreads or diverges thermal or light energy received from a transmitting unit; and an energy converting unit that converts thermal or light energy spread or diverged by the diverging unit into electric energy and supplies electric energy to a target device The apparatus for receiving non-contact energy may include an auxiliary power that receives electric energy from the diverging unit or the energy converting unit and supplied electric energy to the target device when energy transfer from the diverging unit or the energy converting unit to the target device is cut off.

The apparatus for receiving non-contact energy may include a control unit that includes: a wireless energy transfer mode control unit that performs control such that electric energy is transmitted from the energy converting unit to the target device; an auxiliary power operation mode control unit that performs control such that electric energy is transmitted from the auxiliary power to the target device; an auxiliary power remainder sensing unit that senses the charging amount of the auxiliary power; and an auxiliary power remainder warning unit that sends a warning signal to a user when the charging amount of the auxiliary power is less than a reference value, in which the auxiliary power remainder sensing unit or the auxiliary power remainder warning unit may be connected with the auxiliary power and control energy transfer between the auxiliary power and the energy converting unit or the target device.

The transmitting unit may transmit energy at least in any one type of a laser, natural light or artificial light.

The energy converting unit or the auxiliary power may be disposed in the target device or formed integrally with the target device.

Meanwhile, another embodiment of the present invention provides a method of controlling an apparatus for receiving non-contact energy that includes; a receiving unit that is spaced from a transmitting unit and receives thermal or light energy from the transmitting unit; an energy converting unit that converts the thermal or light energy received from the receiving unit into electric energy and supplies electric energy to a target device; and an auxiliary power that receives electric energy from the receiving unit or the energy converting unit and supplies electric energy to the target device when the energy transmitted from the receiving unit or the energy converting unit to the target device is cut off or stopped.

The method may include: a wireless energy transceiving step that transmits energy from the transmitting unit to the receiving unit; a step that senses whether there is an obstacle between the transmitting unit and the receiving unit; a step that supplies energy from the energy converting unit to the target device when there is no obstacle between the transmitting unit and the receiving unit; an auxiliary power charging step that transmits energy from the energy converting unit to the auxiliary power when there is no obstacle between the transmitting unit and the receiving unit; and a step that supplies energy from the auxiliary power to the target device when there is an obstacle between the transmitting unit and the receiving unit.

Advantageous Effects

As described above, since the apparatus for receiving non-contact energy according to the present invention and the method of controlling the apparatus transmit energy or electric power in the type of light or thermal energy, it is possible to reduce harmfulness to the human body.

The apparatus for receiving non-contact energy according to the present invention and the method of controlling the apparatus can increase the region for wirelessly transmitting energy or electric power.

The apparatus for receiving non-contact energy according to the present invention and the method of controlling the apparatus can stably and continuously supply energy to a target device, using the charged auxiliary power, when energy cannot be wirelessly transmitted to the target device due to an obstacle between the transmitting unit and the receiving unit or between the transmitting unit and the diverging unit.

BEST MODE

Hereinafter, exemplary embodiments of the present invention will be described in detail with reference to the accompanying drawings. However, the present invention is not limited to the embodiments. Like reference numerals given in the drawings indicate like components.

Figure 1:
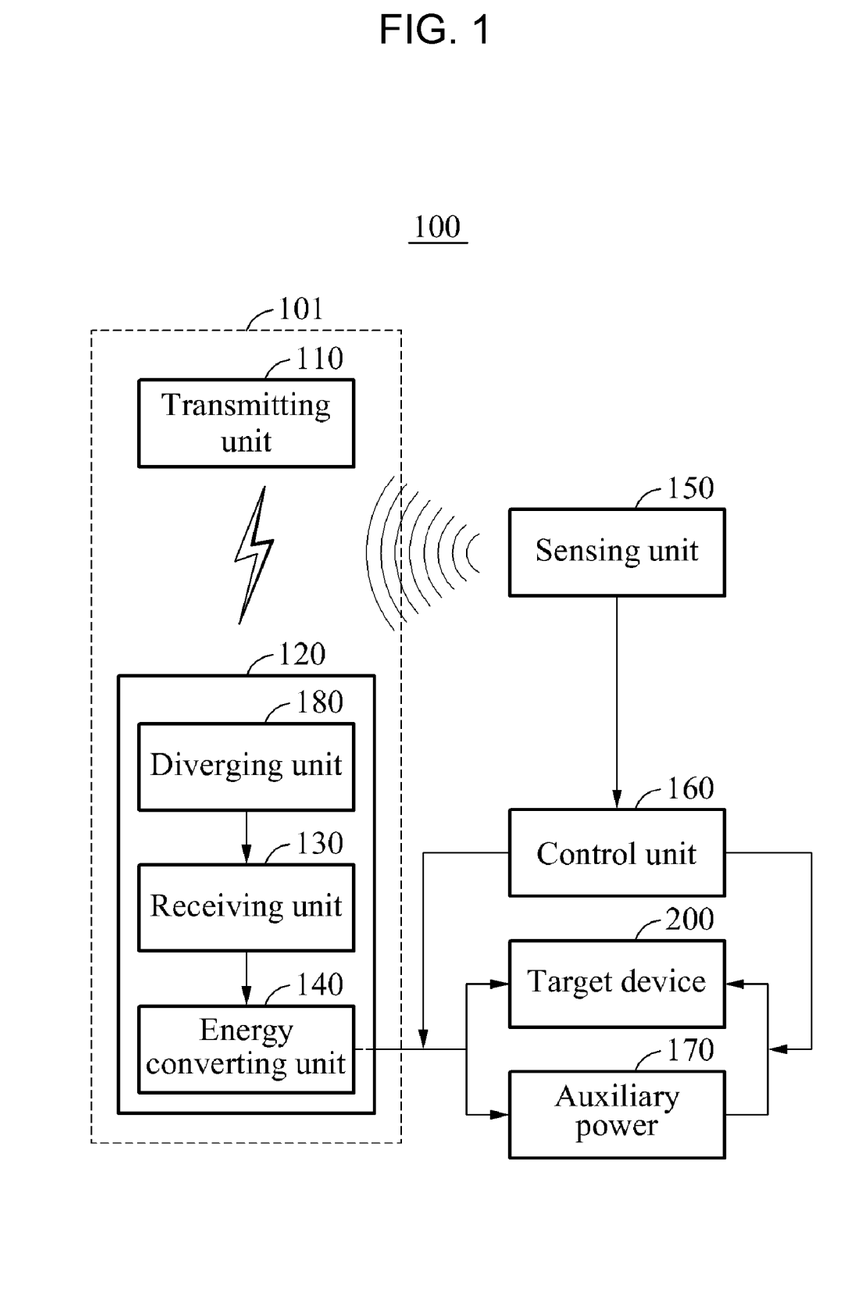
FIG. 1 is a diagram illustrating the configuration of non-contact energy transmission equipment according to an embodiment of the present invention.
Figure 2:
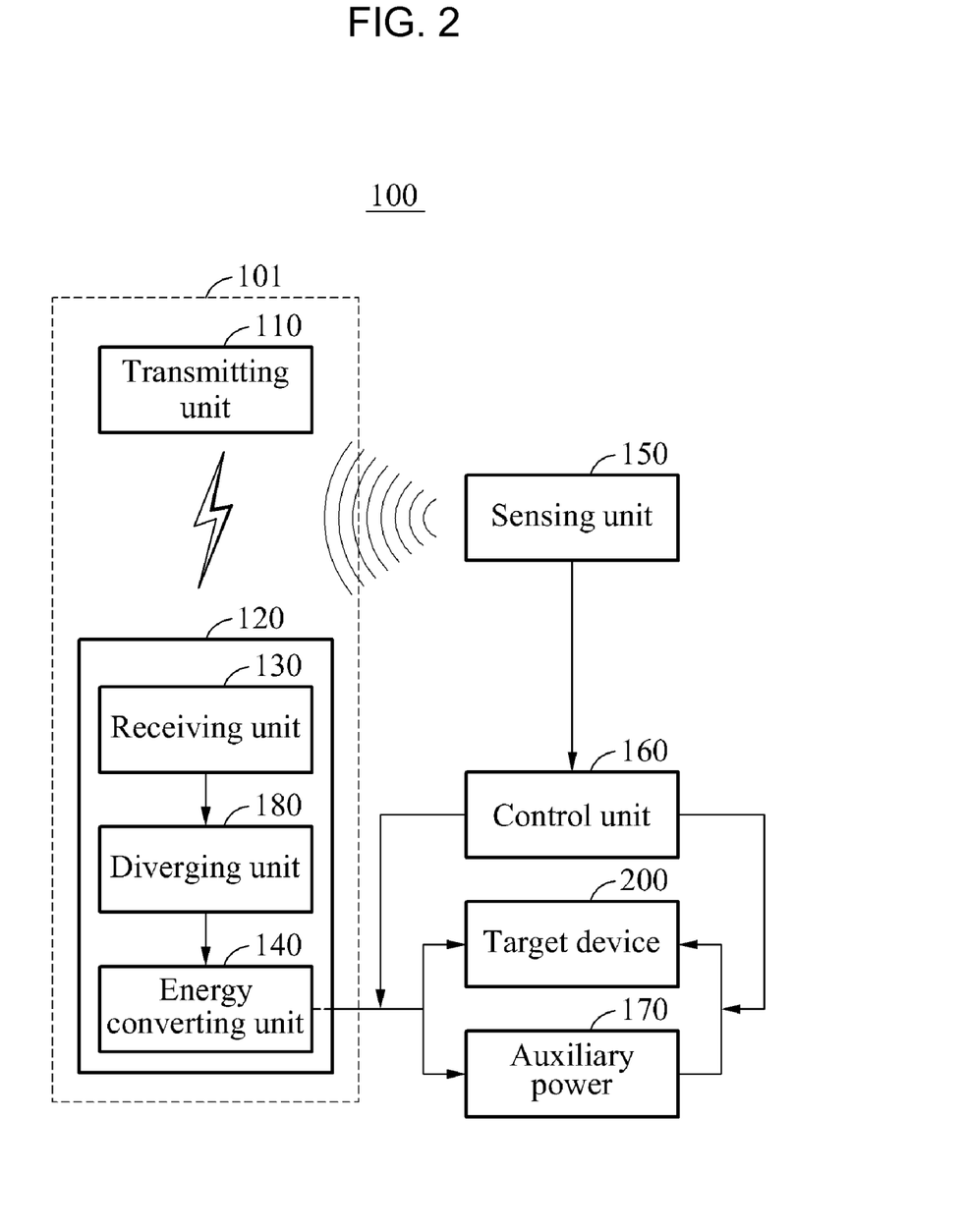
FIG. 2 is a view illustrating the configuration of a modification of the non-contact energy transmission equipment illustrated in FIG. 1.
Figure 3:
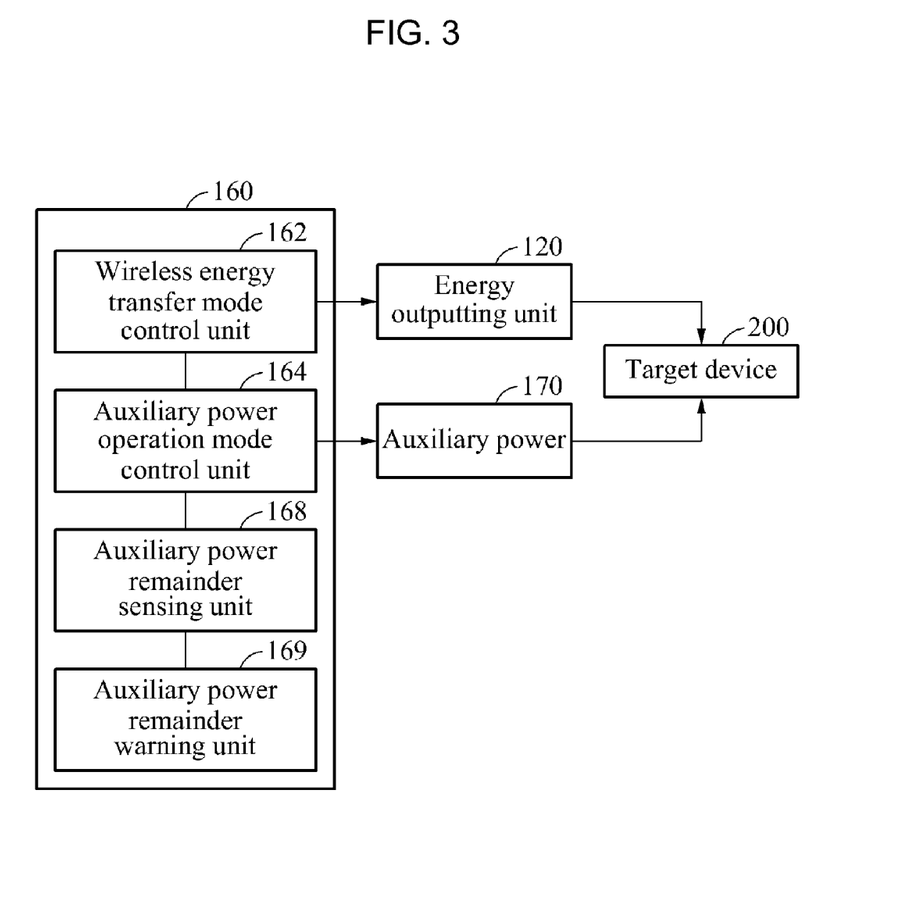
FIG. 3 is a diagram illustrating the configuration of a control unit in the non-contact energy transmission equipment illustrated in FIG. 1 or 2.
Figure 4:
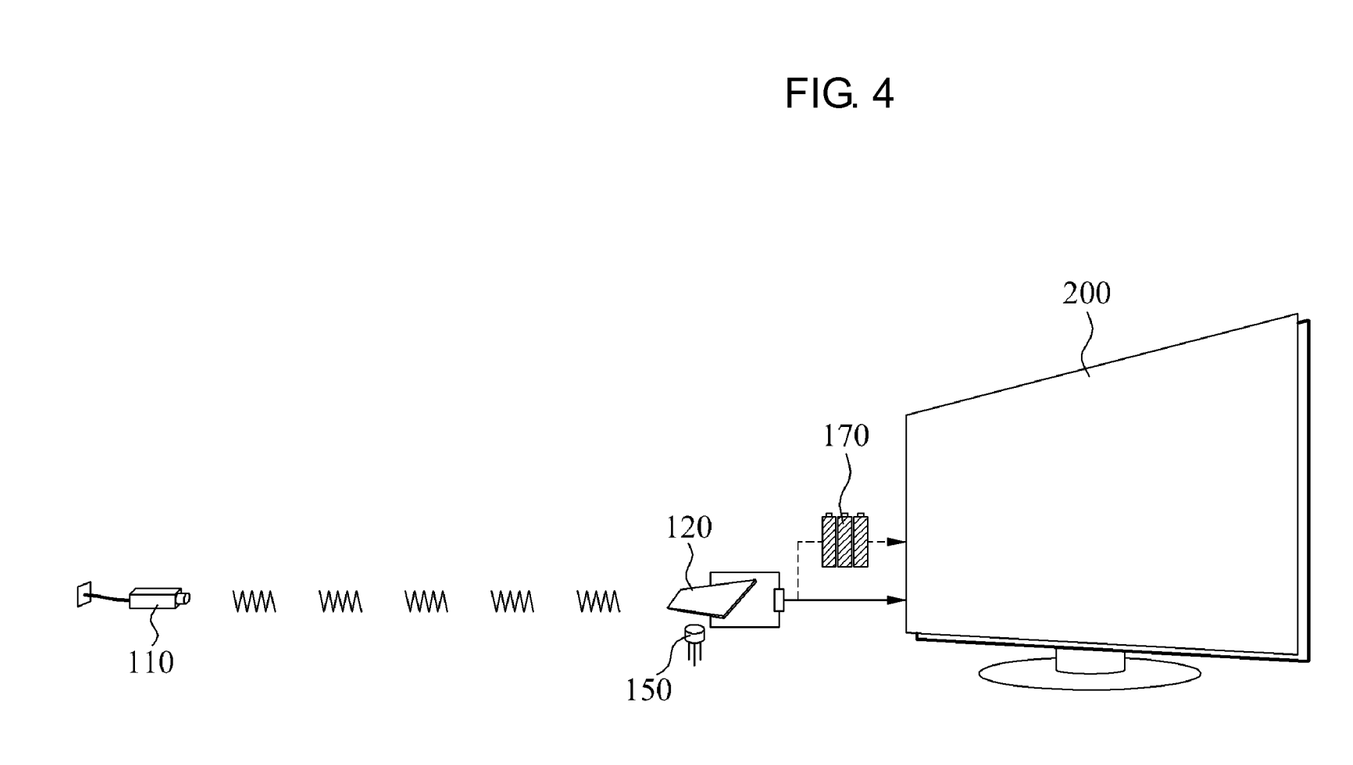
FIGS. 4 and 5 are diagrams illustrating an example of using the non-contact energy transmission equipment illustrated in FIG. 1 or 2.
Figure 5:
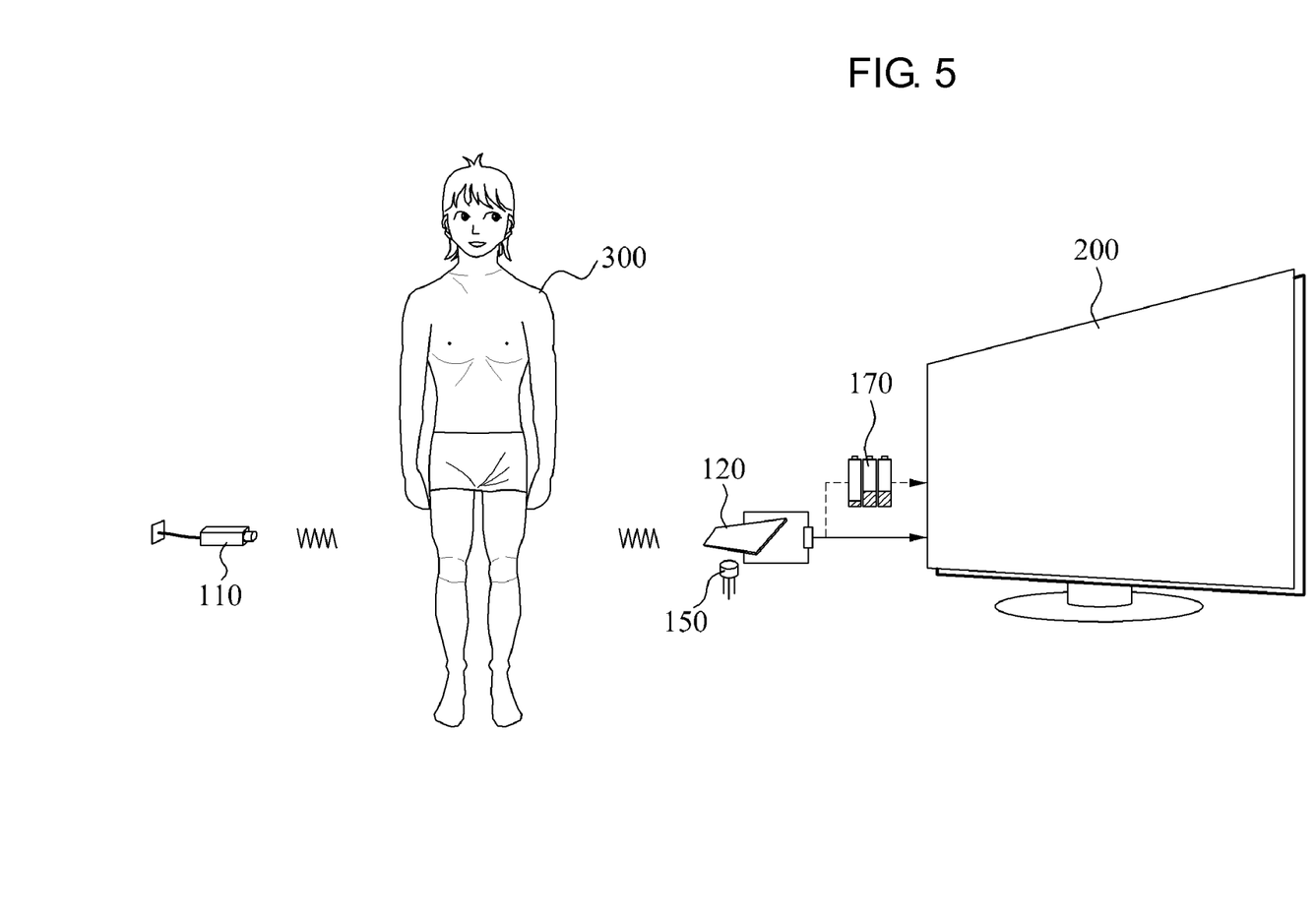
Figure 6:
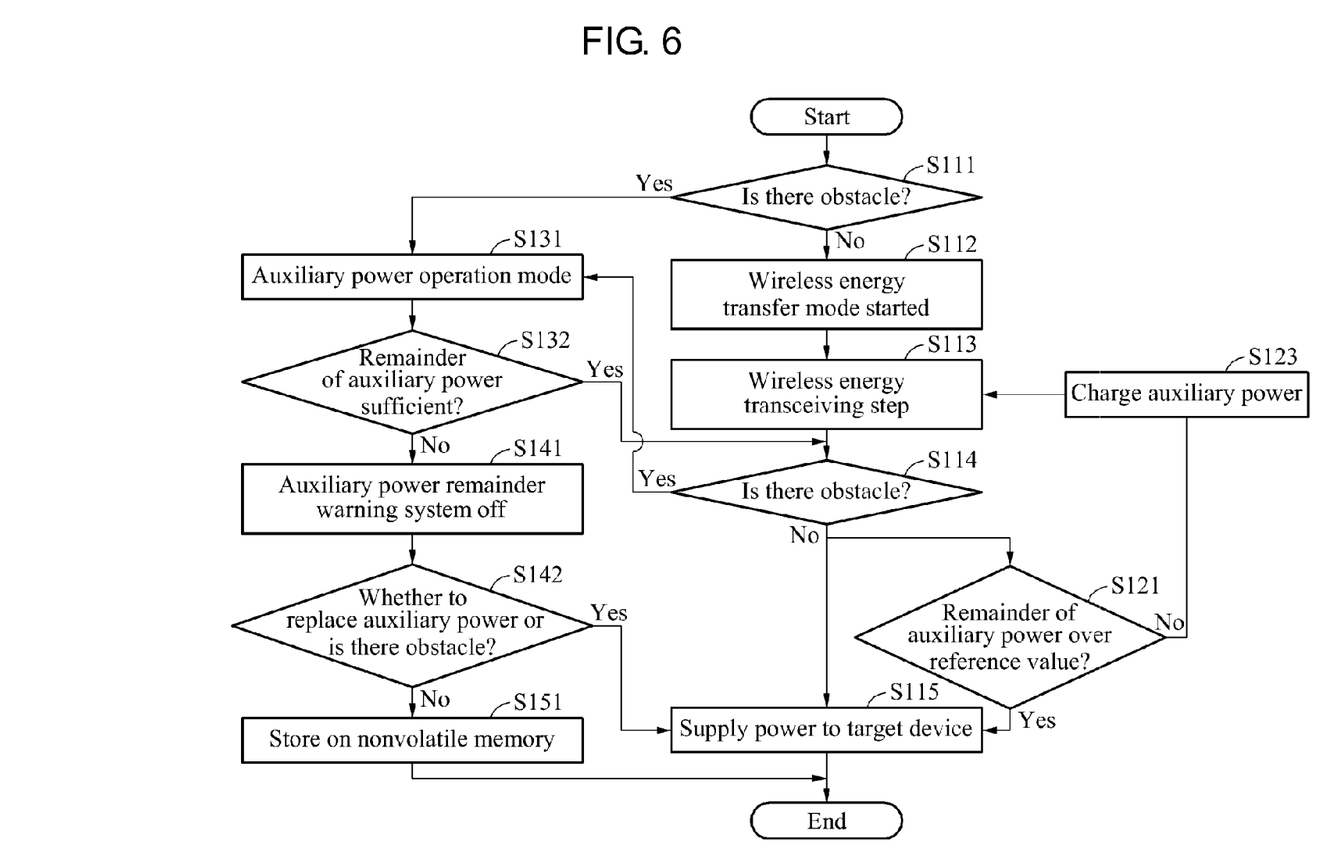
FIG. 6 is a flowchart illustrating a method of controlling the non-contact energy transmission equipment illustrated in FIG. 1 or 2.

FIG. 1 is a diagram illustrating the configuration of non-contact energy transmission equipment according to an embodiment of the present invention, FIG. 2 is a view illustrating the configuration of a modification of the non-contact energy transmission equipment illustrated in FIG. 1, FIG. 3 is a diagram illustrating the configuration of a control unit in the non-contact energy transmission equipment illustrated in FIG. 1 or 2, FIGS. 4 and 5 are diagrams illustrating an example of using the non-contact energy transmission equipment illustrated in FIG. 1 or 2, and FIG. 6 is a flowchart illustrating a method of controlling the non-contact energy transmission equipment illustrated in FIG. 1 or 2.

Non-contact energy transfer equipment 100 according to an embodiment of the present invention, which relates to a wireless energy transfer technology, can wirelessly transmit electric power or energy, using a laser, light or heat. The terms "wireless energy" or "wireless energy transfer" used hereafter include the meaning of wirelessly transmitting electric power using light energy or thermal energy.

Referring to FIG. 1, the non-contact energy transfer equipment 100 according to an embodiment of the present invention may include a transmitting unit 110 that converts electric energy into thermal energy or light energy and then sends it out and a receiving device 102 that converts the thermal energy or the light energy from the transmitting unit 110 into electric energy and supplies it to a target device 200 or an auxiliary power 170.

The apparatus for receiving non-contact energy 102 included in the non-contact energy transfer equipment 100 according to an embodiment of the present invention may include a diverging unit 180 that is spaced from the transmitting unit 110 and receives and diverges the thermal or light energy in a wireless type from the transmitting unit 110, a receiving unit 130 that receives the thermal or light energy diverged from the diverging unit 180, an energy converting unit 140 that converts the thermal or light energy received by the receiving unit 130 into electric energy and supplies the electric energy to a target device 200, a sensing unit 150 that senses whether there is an obstacle between the transmitting unit 110 and the diverging unit 180 or the receiving unit 130 or senses whether energy keeps being transceived between the transmitting unit 110 and the diverging unit 180 or the receiving unit 130, a control unit 160 that maintains/stops energy transfer between the energy converting unit 140 and the target device 200 in accordance with a sensing value of the sensing unit 150, and an auxiliary power 170 that receives electric energy from the energy converting unit 140 and is operated to supply electric energy to the target device 200 by the control unit 160, when the energy transmitted between the energy converting unit 140 and the target device 200 is cut off.

As described above, as electric power or energy is transmitted in a non-contact or wireless type by thermal energy or light energy, it is possible to achieve the non-contact energy transfer device 102 that has a wide wireless energy transfer region and can stably supply electric power with high energy transfer efficiency without being harmful to the human body. The apparatus for receiving non-contact energy 102 according to the present invention may transmit other type of energy than the thermal or light energy to the target device 200 in a non-contact or wireless type.

The diverging unit 180 of the receiving unit 130, or the energy converting unit 140 of the apparatus for receiving non-contact energy 102 according to the present invention may be integrally formed or included an energy outputting unit 120. Further, the transmitting unit 110, the diverging unit 180, the receiving unit 130, and the energy converting unit 140 may form a wireless energy transceiver (not illustrated).

Since the transmitting unit 110 is spaced or separated from the receiving unit 130 or the diverging unit 180, the transmitting unit 110 transmits energy or electric power not in contact with the receiving unit 130 or the diverging unit 180, that is, a non-contact type.

The transmitting unit 110 can receive electric energy, convert it into a laser and thermal energy or light energy, and transmit the laser and thermal or light energy to the diverging unit 180 or the receiving unit 130.

When the transmitting unit 110 transmits energy into the type of a laser, a laser diode may be used for the transmitting unit 110. The transmitting unit 110 can converts electric energy into thermal energy with a wavelength of 1200 nm or more, using a laser diode, and performs wireless energy transfer by beaming to the receiving unit 130.

When the transmitting unit 110 transmits energy in the type of a laser, the energy outputting unit 120 may further include the diverging unit 180. The diverging unit 180 is a component that receives the laser from the transmitting unit 110 and diverges or spreads it. Since the laser concentrates on one small point with a small incident area, the diverging unit 180 can be used to increase the area of the incident laser on the receiving unit 130, that is, the portion where the laser comes in contact with the receiving unit 130 as large as possible. For example, the diverging unit 180 may be concave lens.

The diverging unit 180 may further include a housing to further increase the contact area of the spread or diverged laser and the receiving unit 130. For example, the laser may be spread or diverged in a circle, and when the receiving unit 130 is a rectangular solar cell, the entire receiving unit 130 cannot be brought in contact with the laser. Obviously, when the laser is spread or diverged in a circle larger than the receiving unit 130, the entire receiving unit 130 may be brought in contact with the laser, but some of the energy may be lost.

In this case, it is possible to increase the contact area by bringing the spread or diverged laser in contact with the entire receiving unit 130, using a rectangular cone-shaped housing as the portion coming in contact with the receiving unit 130. The inside of the housing may be made of a material that reflects light or thermal energy.

The diverging unit 180 may use or include various shapes of housings in accordance with the shape of the receiving unit 130. For example, when the receiving unit 130 is a circular or elliptical solar cell, the diverging unit 180 can increase the contact area of the laser and the receiving unit 130 as large as possible by including a conical housing in order to increase the contact area of the laser and the receiving unit 130 as large as possible.

As described above, the laser is diverged or spread from the diverging unit 180 and travels into the receiving unit 130, the contact area of the laser and the receiving unit 130 is large, and accordingly, the efficiency of generating electric energy can be increased.

The diverging unit 180 can also adjust the reception direction of the laser to increase the reception ratio of the laser. That is, the diverging unit 180 can be fixed and also in order to adjust or change an angle of the diverging unit 180 facing the transmitting unit 110, the diverging unit 180 can be provided. For example, the diverging unit 180 may be mounted on the target device 200 by a rotary motor (not illustrated) or a universal joint (not illustrated).

When the diverging unit 180 is mounted by a rotary motor, it is preferable that a sensing unit (not illustrated) that can senses the direction of a laser is provided, in which the direction and the angle of the diverging unit 180 can be automatically adjusted by the sensing unit and the rotary motor. When the diverging unit 180 is mounted by a universal joint, the direction or the angle of the diverging unit 180 can be manually adjusted by a user.

Meanwhile, the diverging unit 180 may be disposed not only at the front of the receiving unit 130, but the rear of the receiving unit 130, that is, between the receiving unit 130 and the energy converting unit 140, as illustrated in FIG. 2. In this case, it is possible to the area of the laser traveling into the converting unit 140 by diverging and spreading the laser or the energy from the receiving unit 130.

In FIG. 1, the receiving unit 130 indirectly receives thermal or light energy from the transmitting unit 110. That is, the receiving unit 130 indirectly receives thermal or light energy from the transmitting unit 110 through the diverging unit 180. The energy converting unit 140 supplies electric energy to the target device 200 by converting the thermal or light energy directly received from the receiving unit 130 into electric energy. The diverging unit 180 may be disposed at the front of the receiving unit 130 to spread or diverge the thermal or light energy directly received from the transmitting unit 110 and sends it to the receiving unit 130.

In contrast, in FIG. 2, the receiving unit 130 directly receives thermal or light energy from the transmitting unit 110. The energy converting unit 140 supplies electric energy to the target device 200 by converting the thermal or light energy indirectly received from the receiving unit 130 into electric energy. That is, the energy converting unit 140 indirectly receives thermal or light energy from the receiving unit 110 through the diverging unit 180. The diverging unit 180 may be disposed between the receiving unit 130 and the energy transmitting unit 140 to spread or diverge the thermal or light energy indirectly received from the transmitting unit 110 through the receiving unit 130 and send it to the energy converting unit 140.

The diverging unit 180 may be provided to diverge or spread not only a laser, but light type energy or heat type energy. The diverging unit 180 may not be provided. When wireless energy transfer is performed in the type of a laser, in respect of harmfulness to the human body, since it is sensed as not light, but heat at a wavelength over 1200 nm, harmfulness to the human body is not a matter. Further, the excellent directionality of a laser and the characteristics as a parallel beam that can propagate to a great distance allows for a wireless energy transfer technology that can transfer energy to 100 m or more.

The transmitting unit 110 can transmit energy at least in any one type of a laser, natural light or artificial light. The transmitting unit 110 is not limited to transmitting a laser, but it can transmit energy in the type of natural light or artificial light. Accordingly, the receiving unit 130 may include at least any one of a solar cell, a solar collector, or a solar concentrator.

When the target device 200 that wirelessly receives energy is a consumer electronic, for example, a television or a refrigerator, the transmitting unit 110 may be made transmit artificial light. Further, it may be possible to use a fluorescent light in the interior where a consumer electronic is installed, without forming the separate transmitting unit 110. In this case, the receiving unit 130 may be made track a light source so that light energy can be received as much as possible from a light source such as a fluorescent light fixed at a predetermined position.

The receiving unit 130, the diverging unit 180, or the auxiliary unit 170 may be formed in the target device 200 or formed integrally with the target device 200. For example, as illustrated in FIGS. 4 and 5, when the target device 200 is a digital television, the receiving unit 130, the diverging unit 180, or the auxiliary unit 170 may be formed inside the bezel (edge) of the television. Further, when the target device 200 is a refrigerator, they may be disposed inside the rear or the top of the refrigerator, and when it is a washing machine, they may be formed close to the detergent container. As described above, by integrally forming the receiving unit 130, the diverging unit 180, or the auxiliary power 170 with the target device 200 or disposing them in the target device 200, it is possible to remove the inconvenience of separately install the receiving unit 130, the diverging unit 180, or the auxiliary power 170. In some cases, it is preferable to dispose the sensing unit 150 or the control unit 160 also in the target device 200.

When the transmitting unit 110 is a laser diode, it is preferable that the receiving unit 130 is a solar cell. It is possible to solve the problem of low efficiency in the wireless energy transfer technology of the related art by using a multiple junction solar cell structure using germanium, with a high efficiency of about 40% under concentrated illumination.

For a multilayer structure cell of Multi-Layer Anti-reflective Coating, it can absorb a wavelength of 300 to 1800 nm, it is possible to achieve wireless energy transfer with a high efficiency when transmitting a wavelength of 1200 nm or more. The transmitting unit 110 can transmit energy having a wavelength of 1200 nm or more to the receiving unit 130.

Further, it is possible to Gallium antimonide (GaSb) and Indium phosphide (InP), which are III-V semiconductors having a direct band gap structure illustrating a high efficiency in a specific long wavelength region, for the band of 1400 nm and the band of 1200 nm, respectively, in accordance with the wavelength of the laser to be used.

Referring to FIG. 3, the control unit 160 of the apparatus for receiving non-contact energy 102 according to an embodiment of the present invention may include a wireless energy transfer mode control unit 162 that performs control such that electric energy is transmitted to the target device 200 from the energy converting unit 140 or the energy outputting unit 120, an auxiliary power operation mode control unit 164 that performs control such that electric energy is transmitted to the target device 200 from the auxiliary power 170, an auxiliary power remainder sensing unit 168 that senses the charging amount of the auxiliary power 170, and an auxiliary power remainder warning unit 169 that sends a warning signal to the user, when the charged mount of the auxiliary power 170 is less than a reference value.

The auxiliary power remainder sensing unit 168 or the auxiliary power remainder warning unit 169 can control energy transmission between the auxiliary power 170 and the energy converting unit 140 or the target device 200, connected with the auxiliary unit 170.

The energy converting unit 140 can transmit electric energy to the target device 200 and the auxiliary power 170. That is, the energy transmitted to the receiving unit 130 in the type of light or thermal energy or a laser beam from the transmitting unit 110 is converted into electric energy by the energy converting unit 140, so it is possible to supply energy or electric power to the target device 200 to be wirelessly supplied with electric power or energy or to charge the auxiliary power 170 for an emergency.

In the apparatus for receiving non-contact energy 102 according to the present invention, since the distance between the transmitting unit 110 and the receiving unit 130 is large in comparison to the wireless energy transfer technology of the related art, there may be an obstacle between the transmitting unit 110 and the receiving unit 130. When there is an obstacle between the transmitting unit 110 and the receiving unit 130 or the diverging unit 180, the receiving unit 130 or the diverging unit 180 cannot receive energy, and thus, electric power or energy cannot be supplied to the target device 200. In order to take precaution against to this case, the apparatus for receiving non-contact energy 102 according to an embodiment of the present invention includes the auxiliary power 170.

FIGS. 4 and 5 are diagrams illustrating an example of using the non-contact energy transmission equipment illustrated in FIG. 1. The target device 200 illustrated in FIGS. 4 and 5 is a digital television. It is possible to stably supply electric power to the target device 200 by making the way of wireless energy supply different in accordance with situations, as illustrated in FIGS. 4 and 5, depending on whether there is an obstacle between the transmitting unit 110 and the receiving unit 130 or the diverging unit 180 or between the transmitting unit 110 and the target device 200.

As illustrated in FIG. 4, when there is no obstacle between the transmitting unit 110 and the receiving unit 130 or the diverging unit 180, electricity is converted in the heat, using a laser diode that is safe for the human body by the transmitting unit 110 of electric energy and is wirelessly transmitted in the type of an invisible laser beam and the heat of the beam transmitted form the receiving unit 130 having a solar cell is converted into electric energy by the energy converting unit 140, thereby supplying electric power. The energy converting unit 140 may be connected with the auxiliary power 170.

As illustrated in FIG. 5, when there is an obstacle 300 between the transmitting unit 110 and the receiving unit 130 or the diverging unit 180 or there is an obstacle 300 such as a human or an object between the transmitting unit 110 and the target device 200, a laser, light or heat may be blocked, not transmitted, to the receiving unit 130 or the diverging unit 180 from the transmitting unit 110 by the obstacle 300. As described above, the when the target device 200 is supplied with energy from the energy converting unit 140 even without the receiving unit 130 or the diverging unit 180 receiving energy, the target device 200 may break down. In order to take precaution against the situation that the receiving unit 130 or the diverging unit 180 cannot receive energy due to the obstacle 300, the receiving device 102 according to the present invention includes the auxiliary power 170.

It is preferable to use a chargeable/dischargeable secondary battery for the auxiliary power 170. In the normal state without an obstacle between the transmitting unit 110 and the receiving unit 130 or the diverging unit 180, the auxiliary power 170 is charged by the energy converting unit 140. That is, in the normal state, the energy converting unit 140 not only supplies power or energy to the target device 200, but charges the auxiliary power 170. In the normal state, the auxiliary power 170 does not supply power or energy to the target device 200.

If the auxiliary power 170 is overcharged, the auxiliary power remainder sensing unit 168 senses whether the auxiliary power 170 has been overcharged, and it is possible to inform the user of the overcharging of the auxiliary power 170, using the auxiliary power remainder warning unit 169, or cut the connection between the energy converting unit 140 and the auxiliary power 170.

On the other hand, as illustrated in FIG. 5, when light, heat, or a laser beam fails to be transmitted to the receiving unit 130 or the diverging unit 180 from the transmitting unit 110 due to the obstacle 300, an algorithm that immediately turns off the wireless energy transceiver 101 and supplies power or energy to the target device 200 using the auxiliary power 170 is started.

For implementing the algorithm, it is possible to control a VGA camera or an IR sensor with a beam guard for sensing an obstacle and turning off the energy outputting unit 120. The sensing unit 150 is not limited to the camera and the IR sensor and may be anything that can sense an obstacle.

Further, it is possible to use IrDA (Infrared Data Association) for the back channel communication algorithm. The auxiliary power 170 is operated by an algorithm that recovers the consumed electric energy by keeping supplying power in the wireless energy supply mode. That is, when the charging amount of the auxiliary power 170 is less than the reference value, a mode in which the auxiliary power remainder sensing unit 168 starts to operate and the auxiliary power 170 is charged by the energy converting unit 140 can be started.

A method of controlling the connection between the energy converting unit 140 or the auxiliary power 170 and the target device 200, depending on whether there is an obstacle is described hereafter with reference to FIG. 6.

Referring to FIG. 6, the present invention can provide a method of controlling the apparatus for receiving non-contact energy 102, which includes a wireless energy transceiving step (S113) that transmits energy from the transmitting unit 110 to the receiving unit 130 or the diverging unit 180, a step (S114) that senses whether there is an obstacle 300 between the transmitting unit 110 and the receiving unit 130 or the diverging unit 180, a step (S115) that supplies energy from the energy converting unit 140 to the target device 200, where there is no obstacle between the transmitting unit 110 and the receiving unit 130 or the diverging unit 180, an auxiliary power charging step (S123) that transmits energy from the energy converting unit 140 to the auxiliary power 170, when there is no obstacle between the transmitting unit 110 and the receiving unit 130 or the diverging unit 180, and a step (S115) that supplies energy from the auxiliary power 170 to the target device 200, when there is an obstacle 300 between the transmitting unit 110 and the receiving unit 130 or the diverging unit 180.

When the control method starts, the non-connect energy transfer equipment 100 or the apparatus for receiving non-contact energy 102 is turned on. In the early stage of operation of the equipment 100 or the device 102, the step (S111) in which the sensing unit 150 senses whether there is an obstacle 300 between the transmitting unit 110 and the receiving unit 130 or the diverging unit 180 is performed. When there is no obstacle 300 sensed, the wireless energy transfer mode for wirelessly sending/receiving energy in the type of a laser, light, or heat between the transmitting unit 110 and the receiving unit 130 or the diverging unit 180 is operated (S112) and then the step (S113) of transmitting/receiving wireless energy can be performed. The operation of the wireless energy transfer mode may be controlled by the wireless energy transfer mode control unit 162. The wireless energy transfer mode control unit 162 may operate in accordance with whether there is an obstacle 300.

When it is determined that there is an obstacle 300, the auxiliary power operation mode may be performed (S131). When the auxiliary power operation mode is performed, the auxiliary power 170 supplies power or energy to the target device 200. The operation of the auxiliary power operation mode may be controlled by the auxiliary power operation mode control unit 164 and the auxiliary power operation mode control unit 164 can operate in combination with the wireless energy transfer mode control unit 162.

It is possible to sense again whether there is an obstacle after the wireless energy transceiving step (S113) is performed for a predetermined time (S114). When there is no obstacle sensed in the step (S114) of sensing whether there is an obstacle, the energy converting unit 140 can transmit energy simultaneously to the target device 140 and the auxiliary power 170. That is, when it is determined that there is no obstacle by the sensing unit 150, the energy converting unit 140 supplies power or energy to the target device 200 (S115) and the auxiliary power 170 is also charged by the energy converting unit 140 (S123).

Before the step (S123) of charging the auxiliary power 170, it is possible to determine whether the charging remainder of the auxiliary power 170 is over a reference value (S121). That is, when it is determined that the charging remainder is over the reference value by the auxiliary power remainder sensing unit 168, the auxiliary power 170 can supply power or energy to the target device 200. When the charging remainder is not over the reference value, charging is possible, so the step (S123) of charging the auxiliary power 170 can be performed. When the step (S123) of charging the auxiliary power is finished, the wireless energy transceiving step (S113) can be performed again.

On the other hand, when the auxiliary power operation mode step (S131) is performed, the charging amount of the auxiliary power 170 reduces, so it is determined whether the charging remainder is sufficient by the auxiliary power remainder sensing unit 168 (S132). When the remainder of the auxiliary power 170 is sufficient, the step (S114) of sensing whether there is an obstacle is performed, and when the charging remainder is not sufficient, the step (S141) of warning a user of the remainder of the auxiliary power by means of the auxiliary power remainder warning unit 169 can be performed.

After the auxiliary power remainder warning (S141), it is determined whether to replace the auxiliary power 170 or whether there is an obstacle (S142), and in accordance with the result, the process goes to the step of supplying power to the target device 200 (S115) or the step of storing it on a nonvolatile memory (S151) may be performed.

To sum up the control method is briefly explained again, when there is an obstacle sensed in the step (S114) of sensing whether there is an obstacle, the energy transfer from the energy converting unit 140 to the target device 200 is cut off and energy transfer from the auxiliary power 170 to the target device 200 can be started. The charging remainder of the auxiliary power 170 is sensed while energy is transmitted from the auxiliary power 170 to the target device 200 (S132), and when the charging remainder of the auxiliary power 170 is insufficient, it is possible to warn the user of the charging remainder of the auxiliary power 170 (S141).

After the warning of the charging remainder of the auxiliary power 170, it is possible to determine whether to replace the auxiliary power 170 or whether there is an obstacle (S132).

In the step (S114) of sensing whether there is an obstacle between the transmitting unit 110 and the receiving unit 130 or the diverging unit 180, when it is determined that there is no obstacle, it is determined whether the charging remainder of the auxiliary power 170 is over the reference value (S121), and the auxiliary power 170 can be charged by the energy converting unit 140 (S123).

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the sprit of the present invention should not be limited to the above-described embodiments, and the following claims as well as all modified equally or equivalently to the claims are intended to fall within the scope and spirit of the invention.

INDUSTRIAL APPLICABILITY

The present invention can be used for the field of wireless energy transfer or wireless energy transfer.

The invention claimed is:

1. An apparatus for receiving non-contact energy comprising:
    a transmitting unit that converts electric energy into thermal energy or light energy and then sends it out;
    a receiving unit that is spaced from the transmitting unit and receives thermal or light energy from the transmitting unit;
    an energy converting unit that converts the thermal or light energy received by the receiving unit into electric energy and supplies electric energy to a target device;
    a sensing unit that senses whether there is an obstacle between the transmitting unit and the receiving unit;
    a control unit that controls energy supply to the target device according to a sensing value of the sensing unit; and
    an auxiliary power that receives electric energy from the receiving unit or the energy converting unit,
    wherein the auxiliary power supplies electric energy to the target device when the sensing unit senses that there is an obstacle between the transmitting unit and the receiving unit and the supply of non-contact wireless energy between the transmitting unit and the receiving unit is interfered by the obstacle.

2. The apparatus for receiving non-contact energy of claim 1, wherein the control unit includes:
    a wireless energy transfer mode control unit that performs control such that electric energy is transmitted from the energy converting unit to the target device;
    an auxiliary power operation mode control unit that performs control such that electric energy is transmitted from the auxiliary power to the target device;
    an auxiliary power remainder sensing unit that senses charging amount of the auxiliary power; and
    an auxiliary power remainder warning unit that sends a warning signal to a user when the charging amount of the auxiliary power is less than a reference value,
    wherein the auxiliary power remainder sensing unit or the auxiliary power remainder warning unit is connected with the auxiliary power and controls energy supply between the auxiliary power and the energy converting unit or the target device.

3. The apparatus for receiving non-contact energy of claim 1, wherein the transmitting unit transmits energy in the type of at least any one of a laser, natural light, or artificial light.

4. The apparatus for receiving non-contact energy of claim 1, wherein the receiving unit includes at least any one of a solar cell, a solar collector, or a solar concentrator.

5. The apparatus for receiving non-contact energy of claim 1, wherein the energy converting unit or the auxiliary power is disposed in the target device or formed integrally with the target device.

6. The apparatus for receiving non-contact energy of claim 1, wherein, when the sensing unit senses that there is no obstacle between the transmitting unit and the receiving unit, the receiving unit or the energy converting unit supplies electric energy to the target device and the auxiliary power simultaneously.

7. An apparatus for receiving non-contact energy comprising:
    a transmitting unit that converts electric energy into thermal energy or light energy and then sends it out;
    a diverging unit that spreads or diverges thermal or light energy received from a transmitting unit;
    an energy converting unit that converts thermal or light energy spread or diverged by the diverging unit into electric energy and supplies electric energy to a target device;
    a sensing unit that senses whether there is an obstacle between the transmitting unit and the diverging unit;
    a control unit that controls energy transfer between the energy converting unit and the target device according to a sensing value of the sensing unit; and
    an auxiliary power that receives electric energy from the diverging unit or the energy converting unit,
    wherein the auxiliary power supplies electric energy to the target device when the sensing unit senses that there is an obstacle between the transmitting unit and the diverging unit and the supply of non-contact wireless energy between the transmitting unit and the diverging unit is interfered by the obstacle.

8. The apparatus for receiving non-contact energy of claim 7, wherein the control unit includes:
    a wireless energy transfer mode control unit that performs control such that electric energy is transmitted from the energy converting unit to the target device;

an auxiliary power operation mode control unit that performs control such that electric energy is transmitted from the auxiliary power to the target device;

an auxiliary power remainder sensing unit that senses charging amount of the auxiliary power; and an auxiliary power remainder warning unit that sends a warning signal to a user when the charging amount of the auxiliary power is less than a reference value, wherein the auxiliary power remainder sensing unit or the auxiliary power remainder warning unit is connected with the auxiliary power and controls energy transfer between the auxiliary power and the energy converting unit or the target device.

9. The apparatus for receiving non-contact energy of claim 7, wherein the transmitting unit transmits energy in the type of at least any one of a laser, natural light, or artificial light.

10. The apparatus for receiving non-contact energy of claim 7, wherein the energy converting unit or the auxiliary power is disposed in the target device or formed integrally with the target device.

11. A method of controlling an apparatus for receiving non-contact energy including:

converting electric energy into thermal energy or light energy and then sending it out by a transmitting unit;

receiving thermal or light energy from a transmitting unit;

converting the thermal or light energy received by a receiving unit into electric energy;

sensing whether there is an obstacle between the transmitting unit and the receiving unit;

controlling supply of electric energy from the receiving unit to a target device according to the sensing of the obstacle; and supplying electric energy from the receiving unit to the target device and an auxiliary power, wherein the auxiliary power supplies electric energy to the target device when there is an obstacle between the transmitting unit and the receiving unit and the supply of non-contact wireless energy between the transmitting unit and the receiving unit is interfered by the obstacle.

12. The method of claim 11, further comprising:

transmitting the thermal or light energy from the transmitting unit to the receiving unit;

supplying electric energy to the target device and the auxiliary power simultaneously when there is no obstacle between the transmitting unit and the receiving unit.

* * * * *